(12) United States Patent
Jalagam et al.

(10) Patent No.: US 7,496,551 B1
(45) Date of Patent: Feb. 24, 2009

(54) METHODS AND APPARATUS ASSOCIATED WITH ADVISORY GENERATION

(75) Inventors: Sesh Jalagam, Santa Clara, CA (US); John D. Panelli, Campbell, CA (US)

(73) Assignee: EMC Corporation, Hopkinton, MA (US)

( * ) Notice: Subject to any disclaimer, the term of this patent is extended or adjusted under 35 U.S.C. 154(b) by 298 days.

(21) Appl. No.: 11/391,012

(22) Filed: Mar. 28, 2006

(51) Int. Cl.
*G06F 17/00* (2006.01)
*G06N 5/02* (2006.01)

(52) U.S. Cl. ...................................... 706/47
(58) Field of Classification Search ................ None
See application file for complete search history.

(56) References Cited

U.S. PATENT DOCUMENTS

| | | | |
|---|---|---|---|
| 6,421,723 B1 * | 7/2002 | Tawil | 709/224 |
| 6,460,113 B1 * | 10/2002 | Schubert et al. | 711/111 |
| 6,606,690 B2 * | 8/2003 | Padovano | 711/148 |
| 6,742,034 B1 * | 5/2004 | Schubert et al. | 709/226 |
| 6,877,042 B2 * | 4/2005 | Tawil et al. | 709/250 |
| 6,952,678 B2 * | 10/2005 | Williams et al. | 705/1 |
| 6,968,401 B2 * | 11/2005 | McBrearty et al. | 710/38 |
| 6,977,927 B1 * | 12/2005 | Bates et al. | 370/381 |
| 6,983,277 B2 * | 1/2006 | Yamaguchi et al. | 707/8 |
| 7,058,758 B2 * | 6/2006 | Allen et al. | 711/111 |
| 7,076,573 B2 * | 7/2006 | Allen et al. | 710/17 |
| 7,103,653 B2 * | 9/2006 | Iwatani | 709/223 |
| 7,130,909 B2 * | 10/2006 | Yamashita et al. | 709/226 |
| 7,194,486 B2 * | 3/2007 | Ishikawa et al. | 707/200 |
| 7,225,242 B2 * | 5/2007 | Cherian et al. | 709/223 |
| 7,315,807 B1 * | 1/2008 | Lavallee et al. | 703/21 |
| 7,328,307 B2 * | 2/2008 | Hoogterp | 711/114 |
| 7,337,227 B1 * | 2/2008 | Hsieh et al. | 709/227 |
| 7,376,726 B2 * | 5/2008 | Yamashita et al. | 709/223 |
| 7,386,610 B1 * | 6/2008 | Vekiarides | 709/224 |
| 7,397,799 B2 * | 7/2008 | Reed et al. | 370/392 |
| 7,401,137 B1 * | 7/2008 | Gasser et al. | 709/223 |

OTHER PUBLICATIONS

Dynamic Detection and Tolerance of Attacks in Storage Area Networks Djemaiel, Y.; Boudriga, N.; Advanced Information Networking and Applications—Workshops, 2008. AINAW 2008. 22nd International Conference on Mar. 25-28, 2008 pp. 377-382 Digital Object Identifier 10.1109/WAINA.2008.34.*

(Continued)

*Primary Examiner*—Michael B Holmes
(74) *Attorney, Agent, or Firm*—Chapin IP Law, LLC

(57) ABSTRACT

A rule engine process utilizes so-called validator functions to identify how to apply specified sets of different rules to respective types of resources in a storage area network environment. For example, a rule engine initially receives information indicating a given storage area network resource to be validated. The rule engine process identifies a type or characteristic associated with the given resource and, thereafter, selects one of multiple respective validator functions to test the given resource. The selected validator function specifies rule processing information such as which rules to apply to the identified type of resource, an order for applying the rules, and conditions whether certain rules will be applied to the given resource based on an outcome of previously applied rules. In one embodiment, application of a set of rules specified by a respective validator function can yield a range of different types of error and/or warning information.

20 Claims, 8 Drawing Sheets

OTHER PUBLICATIONS

SANchk: An SQL-Based Validation System for SAN Confiuration Gencay, Eray; Kuchlin, Wolfgang; Schafer, Thorsten; Integrated Network Management, 2007. IM '07. 10th IFIP/IEEE International Symposium on May 21, 2007-Yearly 25 2007 pp. 333-342 Digital Object Identifier 10.1109/INM.2007.374798.*

Policy-based validation of SAN configuration Agrawal, D.; Giles, J.; Kang-Won Lee; Voruganti, K.; Filali-Adib, K.; Policies for Distributed Systems and Networks, 2004. Policy 2004. Proceedings. Fifth IEEE International Workshop on Jun. 7-9, 2004 pp. 77-86 Digital Object Identifier 10.1109/POLICY.2004.1309152.*

A policy-based approach for user controlled lightpath provisioning Truong, D.L.; Cherkaoui, O.; Elbiaze, H.; Rico, N.; Aboulhamid, M.; Network Operations and Management Symposium, 2004. NOMS 2004. IEEE/IFIP vol. 1, Apr. 23-23, 2004 pp. 859-872 vol. 1 Digital Object Identifier 10.1109/NOMS.2004.1317773.*

Beyond the storage area network: data intensive computing in a distributed enviornmentDuffy, D.; Acks, N.; Noga, V.; Schardt, T.; Gary, J.P.; Fink, B.; Kobler, B.; Donovan, M.; McElvaney, J.; Kamischke, K.; Mass Storage Systems and Technologies, 2005. Proceedings. 22nd IEEE / 13th NASA Goddard Conference on Apr. 11-14, 2005 pp. 232-236.* iSAN: Storage Area Network Management Modeling Simulation Routray, R.; Gopisetty, S.; Galgali, P.; Modi, A.; Nadgowda, S.; Networking, Architecture, and Storage, 2007. NAS 2007. International Conference on Jul. 29-31, 2007 pp. 199-208 Digital Object Identifier 10.1109/NAS.2007.33.*

Building the enterprise-wide storage area network Milanovic, S.; Petrovic, Z.; Eurocon'2001, Trends in Communications, International Conference on. Vol. 1, Jul. 4-7, 2001 pp. 136-139 vol. 1 Digital Object Identifier 10.1109/EURCON.2001.937782.*

Management issues in storage area networks: detection and isolation of performance problems Kochut, A.; Bobroff, N.; Beaty, K.; Kar, G.; Network Operations and Management Symposium, 2004. NOMS 2004. IEEE/IFIP vol. 1, Apr. 23-23, 2004 pp. 453-466 vol. 1 Digital Object Identifier 10.1109/NOMS.2004.1317685.*

* cited by examiner

METHODS AND APPARATUS ASSOCIATED WITH ADVISORY GENERATION

RELATED APPLICATIONS

This application is related to: i) co-pending United States patent application entitled "METHODS AND APPARATUS FOR MAPPING RESOURCES," Ser. No. 11/391,106, filed on Mar. 28, 2006, ii) co-pending United States patent application entitled "METHODS AND APPARATUS FOR RENDERING MESSAGES," Ser. No. 11/390,899, filed on Mar. 28, 2006, and iii) co-pending United States patent application entitled "METHODS AND APPARATUS ASSOCIATED WITH ADVISORY GENERATION," Ser. No. 11/390,900, filed on Mar. 28, 2006, the entire teachings of which are incorporated herein by this reference.

BACKGROUND

In general, a so-called storage area network (SAN) is a collection of data storage systems that are networked via a switching fabric to a number of host computer systems operating as servers. The host computers (also known as servers) of a respective storage area network access data stored in respective data storage systems on behalf of client computers that request data. For example, according to conventional techniques, upon receiving a storage access request, a respective host computer in a storage area network accesses a large repository of storage through a switching fabric on behalf of a corresponding requesting client. An access can include a read or write of data to storage.

Typically, many clients can access data through the same host computer or server. Thus, storage area networks enable multiple clients to access one or more shared storage systems through the same host computer. In many applications, storage area networks support hi-speed acquisitions of data so that the host servers are able to promptly retrieve and store data from the data storage system.

A respective infrastructure supporting access to data in a storage area network can be quite complex. For example, as discussed above, consider the number of hardware and software components that must work in harmony in order for a user to successfully access data stored in a storage array of a SAN. To access such data, a user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system transmits the I/O requests through a host interface device resource, such as an interface card (e.g., SCSI or FibreChannel adapter) having one or more I/O port resources, across an interface cable or networking medium of one or more switches (e.g., in a storage area network implementation) to a front-end adapter interface card resource operating on a high-capacity data storage array of the SAN. The front-end adapter interface card receives the I/O requests and interprets them to identify appropriate data locations within specific storage device resources contained in the storage array.

After the requested data is accessed from the storage devices, respective I/O responses are typically returned from the accessed storage system to the user application along an information or data flow path (based on operations and processing functionality provided by each of the aforementioned components and resources) in a reverse direction back to the application on the host computer running the client application. In this way, access to data in a conventional storage area network involves reliance on a proper operation and coordination of a multitude of software and hardware resources in a storage area network to retrieve data from storage and serve the data to a client.

If even a single resource such as a switch, operating system, host bus adapter, storage system, etc. in a respective storage area network is incompatible with other hardware and/or software resources present in the storage area network, then the storage area network may no longer operate properly and enable a respective user to retrieve stored data.

One conventional way to ensure that a storage area network will work properly (e.g., so that the storage area network enables users to access corresponding stored data) is to utilize a set of interoperability rules to verify that a respective storage area network is configured properly. In general, the set of interoperability rules indicates which combination of different types of hardware and software resources are compatible with each other and can be used together in a respective storage area network. When rules are applied to a respective storage area network configuration, an administrator can identify incompatibilities.

SUMMARY

Conventional applications that support management of storage area network environments can suffer from a number of deficiencies. For example, as discussed above, management of a storage area network can be a challenge due to the complex network of resources that must be combined so that the storage area network operates properly for a multitude of different types of users. Manual verification of a respective configuration by an administrator can be time-consuming as well as require paying close attention to details. In certain cases, if a respective administrator fails to properly identify that a set of one or more storage area network resources are incompatible, one or more clients in communication with a respective server may not be able to access data in the storage area network. Also, conventional rule engines are typically complex and cumbersome to maintain and use.

Techniques discussed herein deviate with respect to conventional applications such as those discussed above as well as other techniques known in the prior art. For example, embodiments herein include a rule engine process that applies sets of rules to different types of storage area network resources for purposes of detecting incompatible combinations and sub-optimal configurations of resources associated with a respective storage area network environment.

More specifically, one embodiment herein includes a rule engine process that utilizes so-called validator functions to identify how to apply specified sets of different rules to respective types of resources in a storage area network environment. For example, a rule engine initially receives information indicating a given resource (e.g., an object representing a storage area network resource) in a respective storage area network environment to be validated. Based on a type (and/or characteristics) associated with the given resource (or object), the rule engine selects one of multiple respective validator functions to apply to the given resource. The selected validator function specifies rule processing information such as which of multiple rules to apply to the identified type of resource, an order for applying the specified rules, and conditions whether certain rules will be applied to the given resource based on an outcome of previously applied rules. In one embodiment, application of a given set of rules associated with a respective validator function can yield a range of different types of error and/or warning information. Use of the validator functions for validation purposes simplifies management and application of sets of rules to the different types of storage area network resources.

In view of the specific embodiment discussed above, more general embodiments herein are directed to a rule engine process that identifies information such as resource types and/or attributes associated with multiple resources in a respective storage area network configuration. The rule engine process utilizes the resource types or attributes associated with the resources to identify corresponding validator functions to apply to the resources. The rule engine process initiates execution of the sets of rules in accordance with the corresponding validator functions for purposes of validating the multiple resources in the storage area network configuration.

In one embodiment, validating a given resource in the storage area network configuration includes verifying that the given resource is compatible for use in the storage area network environment along with other resources associated with the respective storage area network configuration.

Techniques herein are well suited for use in applications such as management of resources in a respective storage area network environments. However, it should be noted that configurations herein are not limited to such use and thus configurations herein and deviations thereof are well suited for use in other types of environments that support application of rules.

In addition to the embodiments discussed above, other embodiments herein include a computerized device (e.g., a host computer, workstation, etc.) configured to support the techniques disclosed herein to manage resources associated with a respective storage area network environment. In such embodiments, the computerized device includes a memory system, a processor (e.g., a processing device), a respective display screen to display messages, and an interconnect system connecting the processor and the memory system. The interconnect system can also support communications with the respective display (e.g., display screen or display medium). The memory system is encoded with a rule engine application that, when executed on the processor, generates a process for applying rules according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to maintain and apply rules according to embodiments herein. For example, the computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for implementing a rule engine according to an embodiment herein. The instructions, when carried out by a processor of a respective computer device, cause the processor to perform the steps of: i) identifying a resource type associated with a given resource of multiple resources in a respective storage area network configuration; ii) utilizing the resource type associated with the given resource to identify a corresponding validator function specifying a set of rules to apply to the identified resource type; and iii) initiating execution of the set of rules in accordance with the corresponding validator function for purposes of validating the given resource in the storage area network. Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate in connection with the Control Center (ECC) software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one embodiment, a rule engine process utilizes so-called validator functions to identify how to apply specified sets of different rules to respective types of resources in a storage area network environment. For example, a rule engine initially receives information indicating a given resource (e.g., an object representing a respective storage area network resource) in a respective storage area network environment to be validated. The rule engine process identifies a type or attributes associated with the given resource. After identifying the type or attributes associated with the given resource, the rule engine process utilizes the learned type or attribute information to select one of multiple respective validator functions to apply to the given resource for purposes of validating the given resource. The selected validator function specifies rule processing information such as which rules to apply to the identified type of resource, an order for applying the rules, and conditions whether certain rules will be applied to the given resource based on an outcome of previously applied rules, etc.

In one embodiment, application of the sets of rules associated with a respective validator function can produce a range of different types of error and/or warning information. For example, application and failure of certain rules can result in generation of error information while application and failure of other rules can result in generation of warning information. Accordingly, following application of rules to validate a respective storage area network configuration, a respective user can be notified of events (e.g., via use of the error and/or warning information) such as which resources in a storage area network are incompatible as well as whether a respective storage area network configuration is configured for efficient operation.

Figure 1:
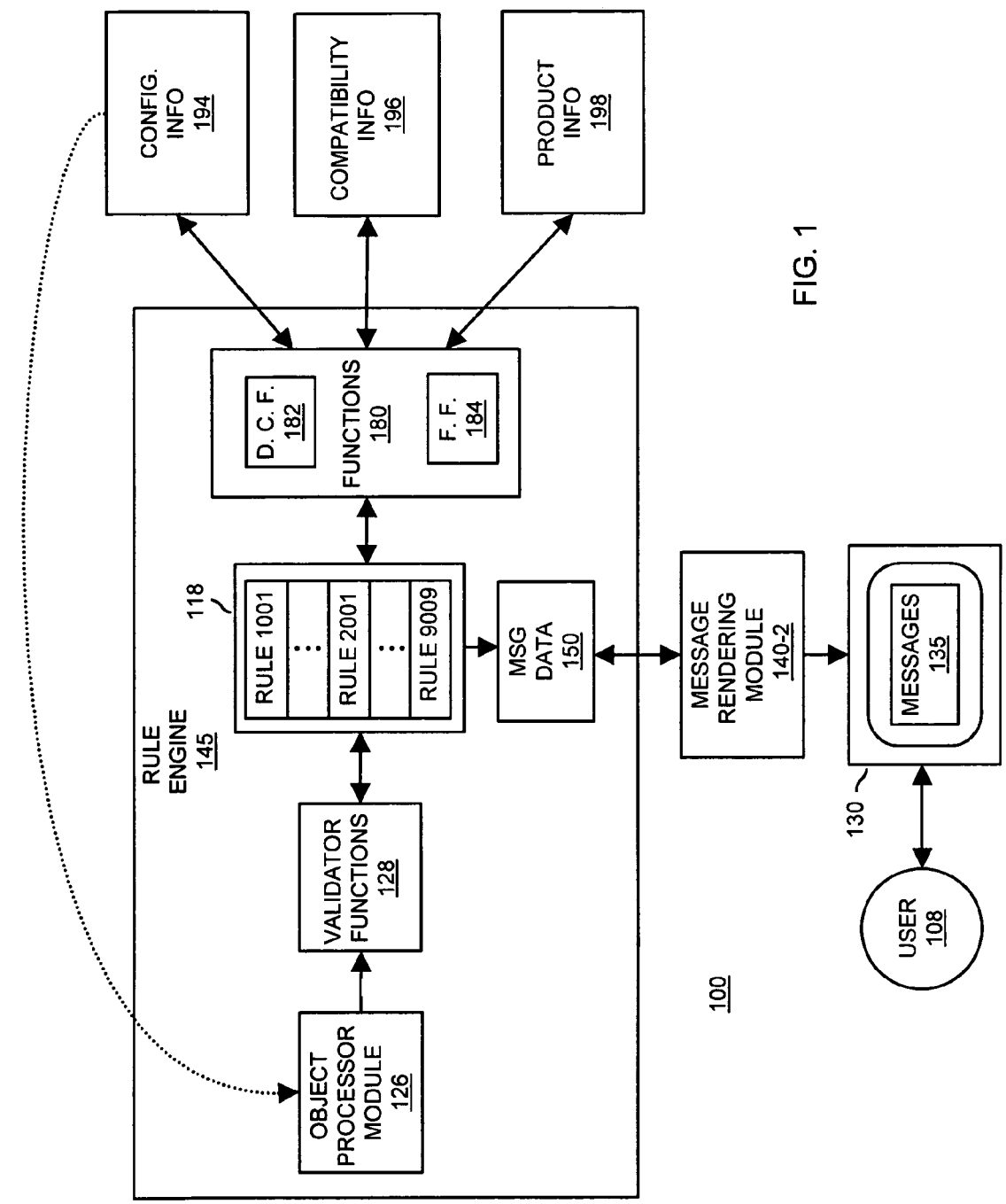
FIG. 1 is a diagram illustrating a rule engine for use in a storage area network environment according to an embodiment herein.

FIG. 1 is a diagram of storage area network environment 100 including a rule engine 145 for applying rule logic 118 (e.g., software code to carry out application of rules) according to embodiments herein. As shown, storage area network environment 100 includes rule engine 145, message rendering module 140-2, display screen 130, user 108, configuration information 194 (e.g., storage area network configuration information), compatibility information 196, and product information 198. Rule engine 145 includes an object processor module 126, validator functions 128, rule logic 118, message data 150, and functions 180. Functions 180 include data filter functions 182 and data collection functions 184. Display screen 130 selectively displays messages 135 for viewing by user 108.

In general, rule engine 145 of FIG. 1 validates a configuration associated with a system such as a respective storage area network. Upon detecting a configuration error or that a respective storage area network configuration is sub-optimal based on application of rule logic 118, rule engine 145 generates message data 150. Message rendering module 140-2 can utilize the message data 150 (generated by rule logic 118) for purposes of generating messages 135 on display screen 130 for a respective user 108. Accordingly, a respective user 108 can be notified of whether a configuration has fatal errors or merely whether a respective storage area network configuration is sub-optimal.

In the context of one embodiment, the rule engine 145 initially receives an indication (from user 108 or other entity) of corresponding configuration information 194 associated with the respective storage area network to be validated or checked. The configuration information 194 can include multiple managed objects, each of which includes specific information indicating configuration information associated with a respective resource in the storage area network. Resources (to be validated, verified, checked, tested, . . . ) can include elements in the storage area network such as host resources, switch resources, storage resources, etc. as more particularly shown and discussed in FIG. 8.

Referring again to FIG. 1, to validate a respective storage area network, the object processor module 126 of rule engine 145 retrieves each of multiple objects from configuration information 194 and applies rule logic 118 (e.g., instructions to carry out each of multiple different rules) to determine whether the respective storage area network has been configured properly. A combination of the managed objects represents the configuration of the storage area network. Application of rule logic 118 produces different output data (e.g., message data 150) depending on which one or more applied rules happens to fail.

In one embodiment, the object processor module 126 retrieves information from the configuration information 194 at least in part based on an object-by-object (e.g., resource-by-resource) basis. That is, the rule engine 145 can sequentially validate (e.g., based on a predetermined order) the objects in configuration information 194 one at a time. As mentioned, a retrieved object from configuration information 194 indicates configuration information associated with a respective resource in the storage area network. Application of a series of storage area network configuration tests ensures that a respective storage area network has been thoroughly verified for use in storage area network environment 100.

In the context of the present example, assume that rule engine 145 initially utilizes object processor module 126 to identify type or attribute information associated with a given resource of multiple resources in a storage area network. After identifying a type and/or attributes associated with a given resource as specified by the configuration information 194, the rule engine 145 utilizes the learned type or attribute information to select one of multiple respective validator functions 128 to execute for purposes of validating the given resource. In one embodiment, each of the validator functions 128 selected by the rule engine 145 specifies rule processing information such as which of multiple rules to apply to the identified type of resource, an order for applying the rules, conditions under which certain rules will be applied to the given resource, and so on. A more detailed discussion of the validator functions 128 can be found in FIG. 2.

Referring again to FIG. 1, the rule engine 145 applies rules (e.g., rule 1001, rule 2001, . . . ) in the rule logic 118 as specified by the selected validator function (from validator functions 128) pertaining to the resource under test. In one embodiment, object processor module 126 forwards information (e.g., object information) associated with a resource under test to a selected one of the multiple validator functions 128. In turn, the selected validator function sends information such as the object (e.g., configuration information such as that found in a so-called ".SAN" file) associated with the resource under test to rule logic 118 that initiates testing of the resource or object information.

To carry out a respective rule specified by a selected validator function, the rule logic 118 executes functions 180 such as data filter functions 182 and data collection functions 184. Based on execution or calls to functions 180, the rule logic 118 is able to retrieve further information that is used for purposes of testing the resource under test. In certain cases, the rule logic 118 retrieves additional portions (e.g., other object information in a respective SAN file associated with the resource under test) of configuration information 194 to determine how the resource under test and/or other related resources are configured for purposes of carry out one or more rules as specified by the selected validator function.

In addition to potentially retrieving additional related configuration information 194 associated with the resource under test for testing purposes, the rule logic 118 can initiate execution of functions 180 to retrieve further information such as compatibility information 196 and product information 198 associated with the resource under test. For example, rules in the rule logic 118 can utilize the data collection function 182 and the filter function 184 enable rule logic 118 to access compatibility information 196 and thus identify whether a resource under test is compatible with other resources present in the storage area network environment 100. For example, the rules in the rule logic 118 can utilize functions 180 (e.g., data collection function 182 and/or filter function 184) to access specific product information 198 associated with the resource under test for purposes of carrying a respective rule. In other words, application of a respective rule may require more particular or additional knowledge of the resource under test that is not included in object information initially retrieved from the configuration information 194. The functions 180 as discussed above enable retrieval of additional associated with a managed object for purposes of testing the managed object.

Accordingly, one embodiment herein includes a rule engine 145 that identifies a set of information (e.g., information such as configuration information 194, compatibility information 196, and product information 198) required to carry out execution of a respective rule in a selected validator function. The rule engine 145 accesses the required set of information from one or more respective repositories to carry out execution of the respective rule.

As an example of rule engine 145 operation, assume that a resource under test has associated object information retrieved from configuration information 194 identifying a specific make and model of a switch device. Retrieved compatibility information 196 can indicate which types of switches work with which types of hosts and storage arrays in the storage area network. Following retrieval of the compatibility information 196, the rule logic 118 can apply one or more respective rules as specified by a selected validator function to identify whether the switch device is compatible with other types of resources in a particular storage area network configuration.

In one embodiment, application of a set of rules (e.g., one or more rules associated with a selected validator function) applied to a resource under test produces a range of different types of error and/or warning information. For example, application and failure of certain rules in rule logic 118 can result in generation of message data 150 (e.g., error and/or warning information).

A message rendering module 140-2 utilizes message data 150 to generate messages 135 for viewing by a respective user 108. Consequently, following application of rule logic 118 to validate a respective storage area network configuration, a respective user can be notified of events (e.g., via use of the error and/or warning information) such as whether a respective storage area network configuration is operable, which resources in a storage area network are incompatible, whether a respective storage area network configuration is configured for efficient operation, etc.

Figure 2:
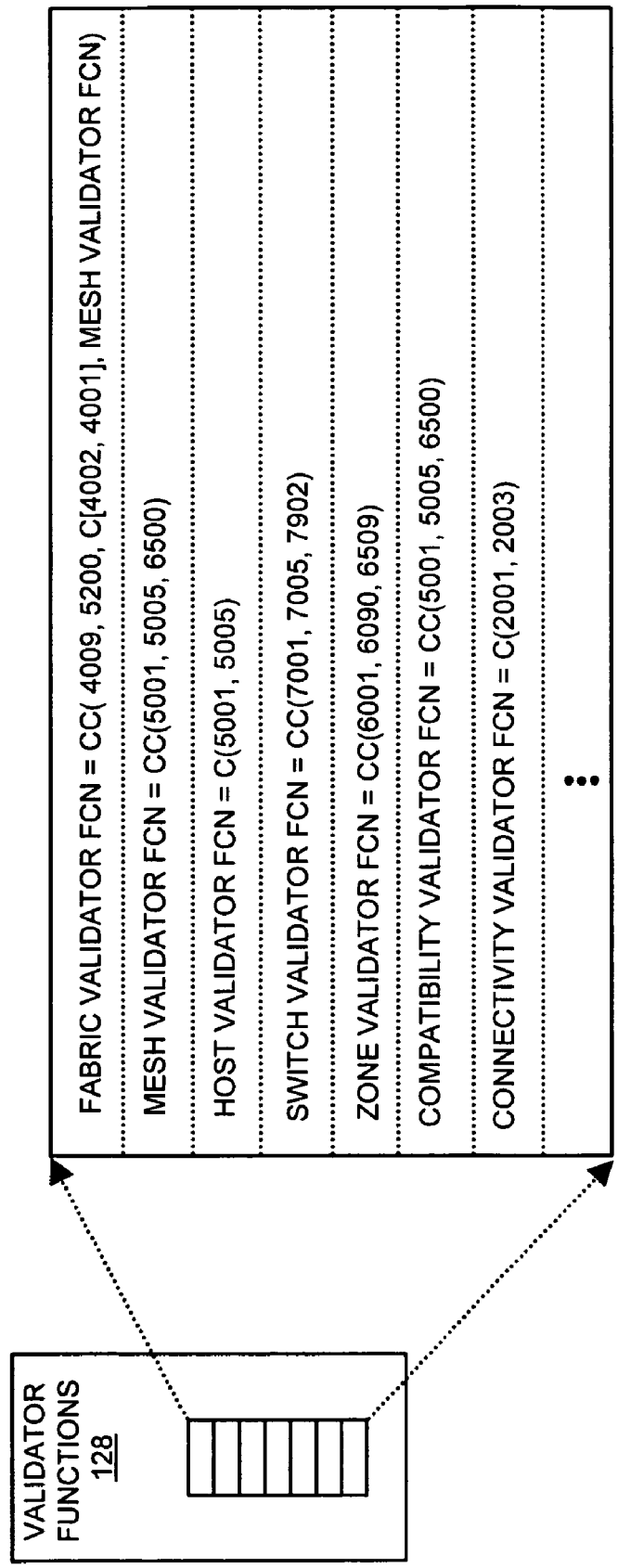
FIG. 2 is a diagram illustrating validator functions according to embodiments herein.

FIG. 2 is a diagram illustrating different validator functions 128 specifying sets of rules to apply to resources according to embodiments herein. As shown, validator functions 128 can include a fabric validator function, mesh validator function, host validator function, . . . , connectivity validator function, and so on.

As discussed above, each of the validator functions 128 can specify a set of rules to be applied to a given storage area network resource under test. For example, as shown in FIG. 2, the fabric validator function indicates to apply rules 4009, 5200, 4002 and 4001 for testing of "fabric" types of resources in a respective storage area network configuration under test.

The letters "CC" in the fabric validator function indicate a type associated with the fabric validator function. For example, CC indicates that the fabric validator is a (or at least partially a) "conditional composite" validator function. Rules (namely, rule 4009, rule 5200, and grouping of rules 4002 and 4001) inside of the outer set of brackets identify a specific order in which to apply rules to the respective resource under test. That is, in the context of the present example, rule 4009 will be applied first because it is first in the sequence of numbers. Rule 5200 will be applied second. Rules 4002 and 4001 will be applied third and fourth in either order. The rules can be embodied in rule logic 118 for purposes of validating a respective fabric in the storage area network environment 100.

In one embodiment, if application of any of the rules in the fabric validator function generates an error or warning, execution of other rules in a respective validator function ceases. For example, during execution of the set of rules associated with fabric validator function, the rule engine 145 first executes rule 4009 according to the predetermined order specified by the fabric validator function. If a respective configuration under test (e.g., a resource under test) violates rule 4009, then the rule engine 145 terminates execution of other rules (e.g., rules 5200, 4002, and 4001) in the set of rules specified by the fabric validator function. If the respective configuration under test does not violate rule 4009 when so applied, then the rule logic 118 applies rule 5200 to the resource under test, and so on. Note that application of a rule or set of rules can result in generation and storage of data used in an informational message as opposed to an error or warning type of message.

In addition to a first set of rules (e.g., rules only in an outer set of brackets), note that the present example of a fabric validator function includes a second set of rules labeled with a letter C and residing in an inner set of square brackets. In other words, the letter C in "C[4002,4001]" of the fabric validator function in FIG. 2 indicates that the rules specified in the inner set of square brackets is a "composition" of rules that can be executed in any order with respect to each other. Thus, assuming that none of the previously applied rules (e.g., rule 4009 and rule 5200) fails when so applied, one acceptable order for applying rules to a respective resource under test includes: apply rule 4009 first, then apply rule 5200, then apply rule 4002, and then apply rule 4001. A second acceptable order for applying rules to a respective resource under test includes: apply rule 4009 first, then apply rule 5200, then apply rule 4001, and then apply rule 4002. That is, as illustrated, rules 4001 and 4002 can be applied in any respective order with respect to each other.

As discussed above, for either acceptable sequence above, execution of the rules ceases if either rule 4009 or rule 5200 produces a violation or rule failure. Consequently, when utilizing the fabric validator function to test a respective fabric in a storage area network environment 100, the rule engine 145 can identify which of two or more rules in the validator function must be applied in a particular order (e.g., sequential order) as well which of two or more rules in a corresponding validator function can be executed in any order with respect to each other. In the context of the present example, rule 4009 must be applied first; rule 5200 must be applied second, etc. Rule 4002 and rule 4001 can be executed in any order with respect to each other but after execution of both rules 4009 and 5200.

In one embodiment, rules within the square brackets (e.g., a composition portion identified by the letter C) of a respective validator function can indicate which of multiple rules utilize a same set of configuration data. For example, a set of rules specified in a respective set of brackets labeled with the letter C, indicating that rules in the grouping operate on a same set of data. Thus, the rule engine 145 can utilize the validator function for purposes of identifying two or more rules that operate on a same set of configuration data associated with the storage area network configuration. Consequently, the rule engine 145 need only retrieve appropriate information once for one of the rules for purposes of carrying out execution of multiple rules.

Note that validator functions can be nested within each other. For example, if the fabric validator function requires application of the rules in the mesh validator function, the mesh validator function can be nested in the fabric validator function to indicate that execution of the fabric validator function includes execution of the mesh validator function. In other words, according to one embodiment, a fabric validator function can be written as:

FABRIC *VAL FCN*=CC(4009, 5200, C[4002, 4001],
        MESH *VAL FCN*)

Accordingly, the mesh validator function (e.g., one of the multiple validator functions 128) can be nested within the fabric validator function to specify a combined grouping of a first set of rules (e.g., rules 5001, 5005, and 6500) associated with the mesh validator function. The fabric validator function (including the mesh validator function in the present example) thus identifies a combined grouping of all rules (e.g., rules 4009, 5200, 4002, 4001, 5001, 5005, and 6500) to be applied to a specified type of resource (e.g., a fabric) in a storage area network configuration under test.

Figure 3:
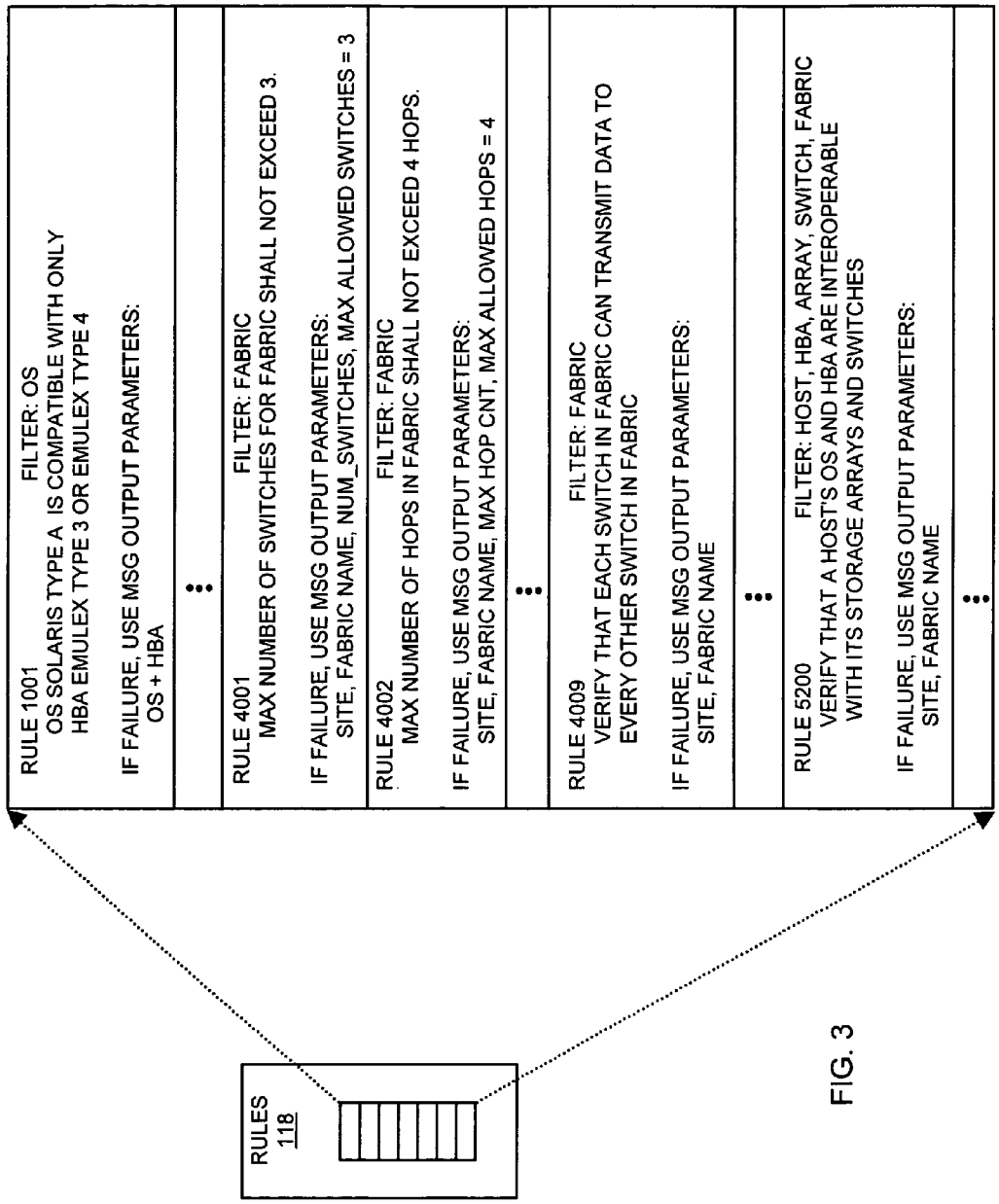
FIG. 3 is a diagram illustrating sample rules according to an embodiment herein.

FIG. 3 is a diagram illustrating a set of example rule logic 118 (e.g., rules) according to embodiments herein. Each rule includes an identifier value (e.g., a rule number) and specifies (e.g., via a filter value) a type of one or more resources to which the rule pertains. Additionally, each rule can specify details associated with a respective test to be applied to a respective resource under test as well as types of message data output parameters to generate in the event that a respective resource under test fails a particular rule. Note that rule engine 145 can select and apply one validator function or multiple validator functions to the same object or resource under test for validation purposes.

The following discussion includes details of how rule engine 145 selects fabric validator function in FIG. 2 and applies corresponding rules as further detailed in FIG. 3 to perform a validation function.

For illustrative purposes, assume in this example that the object processor module 126 in FIG. 1 receives an object (e.g., a resource) identifying a fabric to be tested. Suppose further that rule engine 145 selects the fabric validator function in FIG. 2 to test the received object or resource.

As discussed above, the rule engine 145 employs rule logic 118 to carry execution of rules specified by the fabric validator function. For example, rule engine 145 first applies rule 4009 to the resource under test in order to identify (as indicated by the rule) whether each switch associated with the resource under test is able to transmit data to every other switch in the fabric. As mentioned above, application of rule 4009 (or any other rules for that matter) can require retrieval of other information such other configuration information 194, compatibility information 196, and/or product information 198 associated with the resource under test or other resources related to the resource under test.

If the resource under test violates rule 4009, the rule engine 145 terminates further execution of rules as specified by the fabric validator function and produces a set of data (e.g., appropriate message data 150 to enable creation of error, warning, and/or informational messages 135 for a respective user 108) indicating that the resource under test has failed rule 4009. If the resource under test does not violate rule 4009, the rule engine 145 does not produce a failure, warning or informational message data (for storage in message data 150) and continues processing with the next rule 5200 as specified by the fabric validator function.

Next, rule engine 145 applies rule 5200 to the resource under test in order to identify (as indicated by the rule) whether each of a host's operating system and host bus adapter are interoperable with its specified storage arrays and switches. If not, the rule engine 145 terminates further execution of rules as specified by the fabric validator function and produces a set of data for creating a respective message that the resource under test has failed rule 5200. If the resource under test does not violate rule 5200, the rule engine 145 does not produce a failure message and continues processing with either one of rules 4001 or 4002 as specified by the fabric validator function.

When so applied, rule 4001 and 4002 respectively verify that the number of switches associated with the resource under test does not exceed 3 and the number of hops from an input to an output of the resource under test (e.g., fabric) does not exceed 4. Similar to embodiments discussed above, rule logic 118 associated with the rule engine 145 generates message data 150 if the resource under test fails either of the rules. The respective rules indicate parameter for generating message data 150 if the rule happens to fail.

Note that each rule in FIG. 3 can include an associated filter value. For example, rule 1001 has a filter indicating that rule 1001 applies to "operating system" types of resources. Rule 4001 has a filter indicating that rule 4001 applies to "fabric" types of resources. Rule 4002 has a filter indicating that rule 4002 applies to "fabric" types of resources. Rule 4009 has a filter indicating that rule 4009 applies to "fabric" types of resources. Rule 5200 has a filter indicating that rule 4001 applies to "host," "host bus adapter," "storage array," "switch," and "fabric" types of resources.

Use of the filter information in each rule enables a respective rule engine 145 to apply a second level filter function to identify which rules as specified by a respective validator function will be applied to a given resource under test. For example, selection of the appropriate validator function can be considered a first level filter function executed by the rule engine 145. Accordingly, when initiating execution of a set of rules in accordance with a selected one of multiple validator functions 128, the rule engine 145 can selectively apply each rule in a set of rules as specified by the validator function to the given resource depending on whether a respective rule includes an associated type identifier (e.g., filter value) indicating that the respective rule applies to a type associated with the given resource under test. Thus, the type identifiers indicated by the rules can be used as a second level filter function to determine which rules to apply to a respective resource under test.

As an example, note that the connectivity validator function according to an embodiment herein can be applied to different types of resources such as hosts, switches, storage arrays etc. Accordingly, the connectivity validator function includes a listing of rules that apply to the different types of resources. However, certain rules as specified by a validator function can pertain to some resources and not others. The types of rules to which a respective rule is applicable is indicated by a respective filter value identified in the respective rule. For example, as shown in FIG. 3, rule 1001 applies to operating systems, rule 4001 applies to fabrics, and so on.

Thus, for each rule in a set of rules specified by a corresponding validator function, the rule engine 145 can initially detect whether a respective rule has an associated type identifier indicating to apply the respective rule to a type as specified by a given resource under test. In other words, the rule engine 145 can perform a filter process to identify which of multiple rules specified by a validator function shall be applied to a resource under test based on filter information associated with each of the rules. Accordingly, for each rule that applies to the resource under test, the rule engine 145 executes the respective rules (that pass the first and second level filter tests) to validate the resource under test. For each rule that does pertain to the resource under test as indicated by the filter value, the rule engine 145 disregards execution of the respective rule with respect to the given resource under test.

Figure 4:
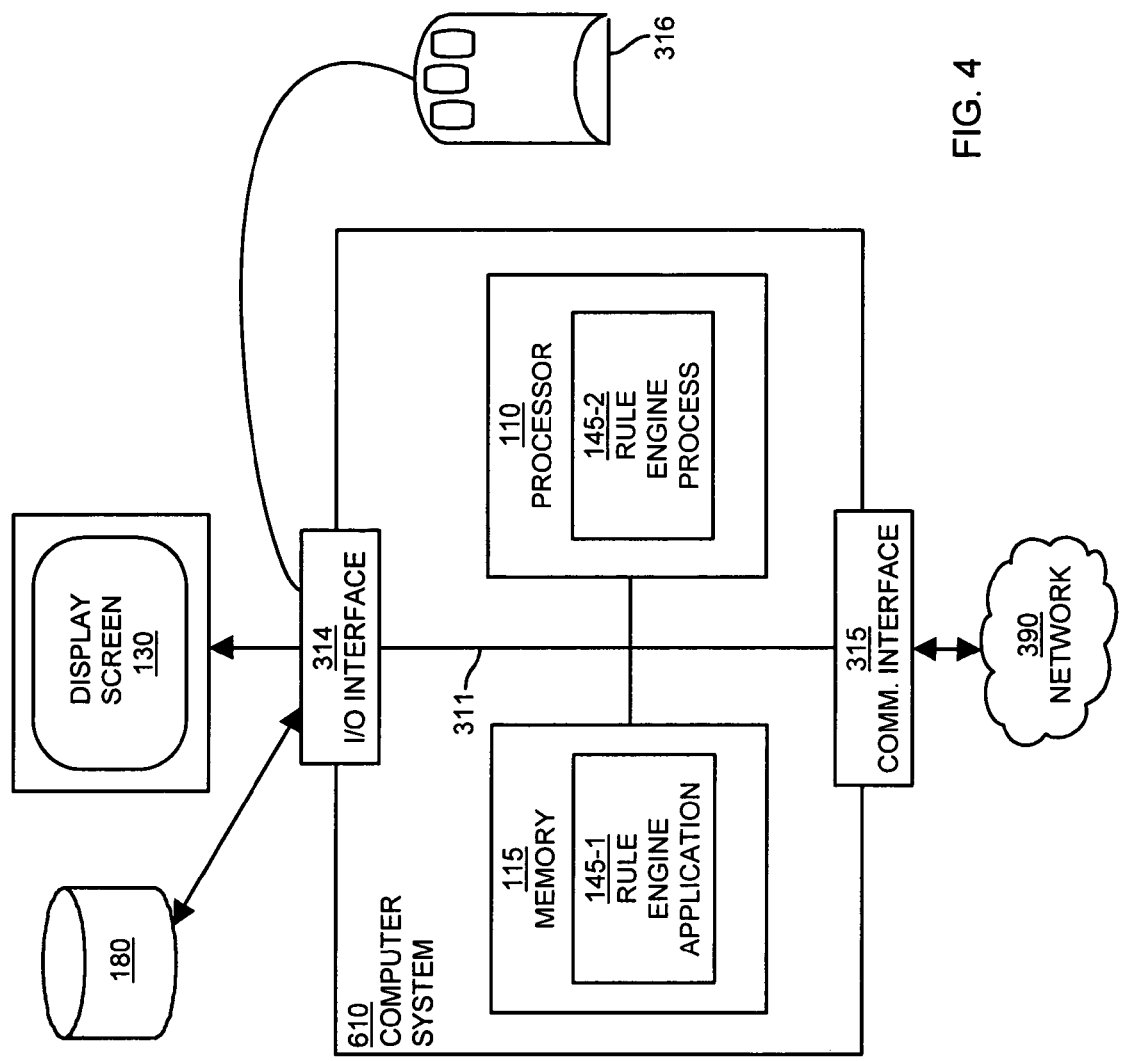
FIG. 4 is a diagram of an example platform for executing a rule engine according to embodiments herein.

FIG. 4 is a block diagram illustrating an example computer system 610 (e.g., a storage area network management control center) for executing a rule engine 145 and other related processes according to embodiments herein. Computer system 610 can be a computerized device such as a personal computer, workstation, portable computing device, console, network terminal, processing device, etc.

As shown, computer system 610 of the present example includes an interconnect 311 that couples a memory system 115, a processor 110, an I/O interface 314, and a communications interface 315. Peripheral devices 316 (e.g., one or more optional user controlled devices such as a keyboard, mouse, display screens, etc.) couple to processor 110 through I/O interface 314. I/O interface 314 also enables computer system 610 to access repository 180 to retrieve information such as configuration information 194, compatibility information 196, and product information 198, apply rule logic 118 and produce message data 150 for potentially displaying messages 135 on display screen 130. Communications interface 315 enables computer system 310 to communicate over network 390 to transmit and receive information from different resources.

In one embodiment, computer system 610 can initiate the display of configuration information on corresponding display screens for viewing by one or more respective network administrators (e.g., user 108) that manage (e.g., validate) and view configuration associated with storage area network environment 100 (FIG. 1).

As shown, memory system 115 is encoded with rule engine application 145-1 that supports storage area network resource validation according to embodiments herein. Rule engine application 145-1 can be embodied as software code such as data and/or logic instructions (e.g., code stored in memory 115 or on another computer readable medium such as a disk) that, when executed, support functionality according to different embodiments described herein.

During operation, processor 110 accesses memory system 115 via the interconnect 311 in order to launch, run, execute, interpret or otherwise perform the logic instructions associated with rule engine application 145-1. Execution of rule engine application 145-1 produces processing functionality in rule engine process 145-2. In other words, the rule engine process 145-2 represents one or more portions of the rule engine application 145-1 (or the entire application) performing within or upon the processor 110 in the computer system 610.

It should be noted that the rule engine 145 (as in FIG. 1) can be represented by either one or both of the rule engine application 145-1 and/or the rule engine process 145-2. For purposes of this discussion and different embodiments herein, general reference will again be made to the rule engine 145 as performing or supporting the various steps and functional operations as previously discussed and as will be discussed further in this specification.

It should be noted that, in addition to the rule engine 145, embodiments herein include the rule engine application 145-1 itself (i.e., the un-executed or non-performing logic instructions and/or data). The rule engine application 145-1 can be stored on a computer readable medium such as a floppy disk, hard disk, or optical medium. The rule engine application 145-1 can also be stored in a memory type system such as in firmware, read only memory (ROM), or, as in this example, as executable code within the memory system 115 (e.g., within Random Access Memory or RAM). In addition to these embodiments, it should also be noted that other embodiments herein include the execution of rule engine application 145-1 in processor 110 as the rule engine process 140-2. Thus, those skilled in the art will understand that the computer system 610 may include other processes and/or software and hardware components, such as an operating system that controls allocation and use of hardware resources.

Functionality supported by computer system 610 such as a management control center executing rule engine process 145-2 will now be discussed with respect to flowcharts in FIGS. 5-7. For purposes of this discussion, computer system 610 and, more particularly, message rule engine 145 (e.g., rule engine application 145-1 or rule engine process 145-2) can perform steps in the flowcharts at run-time. This functionality can be extended to the other entities as well. Note that the steps in the below flowcharts need not always be executed in the order shown.

Figure 5:
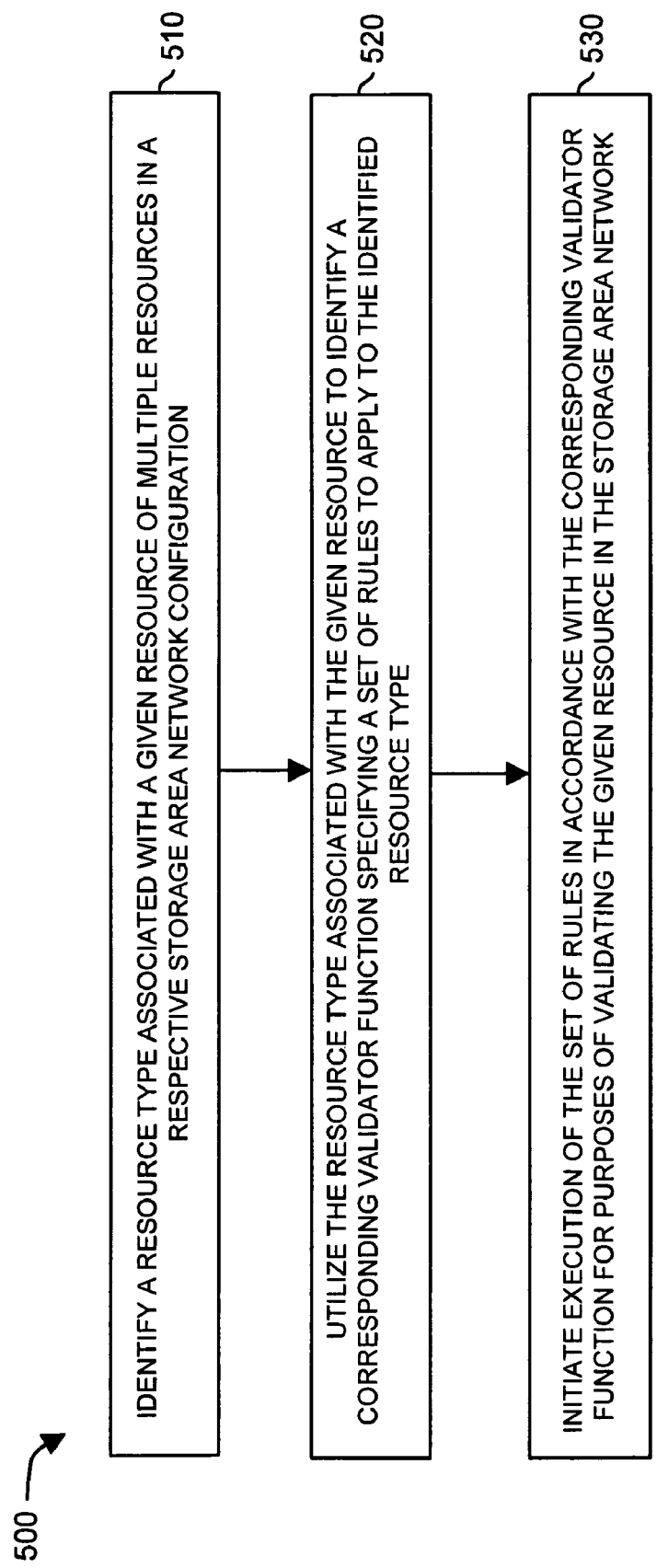
FIG. 5 is a flowchart illustrating techniques associated with a rule engine process according to embodiments herein.

Now, more particularly, FIG. 5 is a flowchart 500 illustrating a technique associated with a rule engine 145 according to an embodiment herein. Note that techniques discussed in flowchart 500 overlap and summarize the techniques discussed above.

In step 510, the rule engine 145 identifies a resource type and/or characteristic information associated with a given resource (e.g., a resource of managed object under test) of multiple resources in a respective storage area network configuration.

In step 520, the rule engine 145 utilizes the resource type and/or attributes associated with the given resource to identify a corresponding validator function specifying a set of rules to apply to the identified resource type (e.g., object or resource under test).

In step 530, the rule engine 145 initiates execution of the set of rules in accordance with the corresponding validator function for purposes of validating the given resource in the storage area network.

Figure 6:
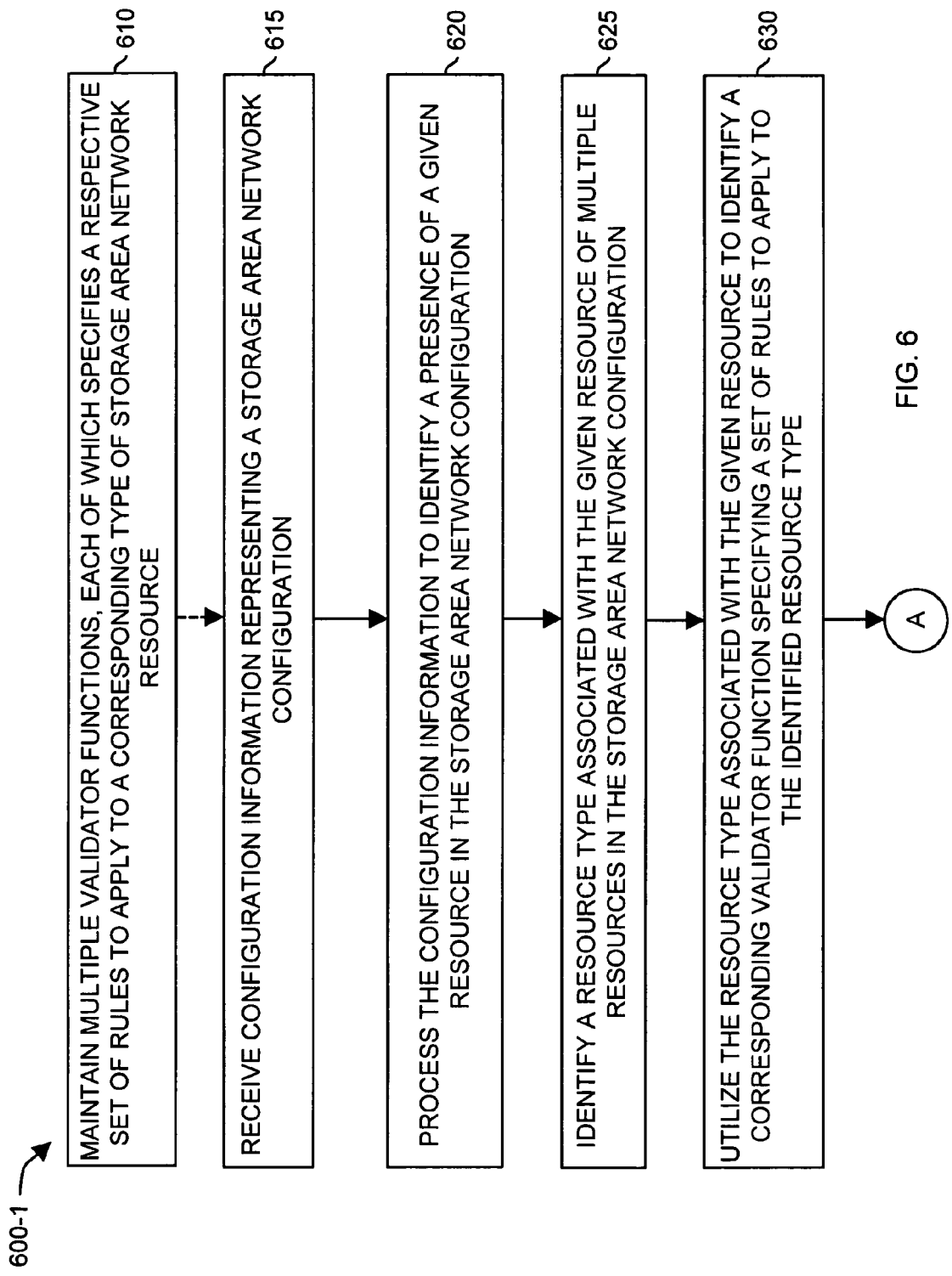
FIGS. 6 and 7 combine to form a more detailed flowchart illustrating techniques associated with a rule engine according to embodiments herein.
Figure 7:
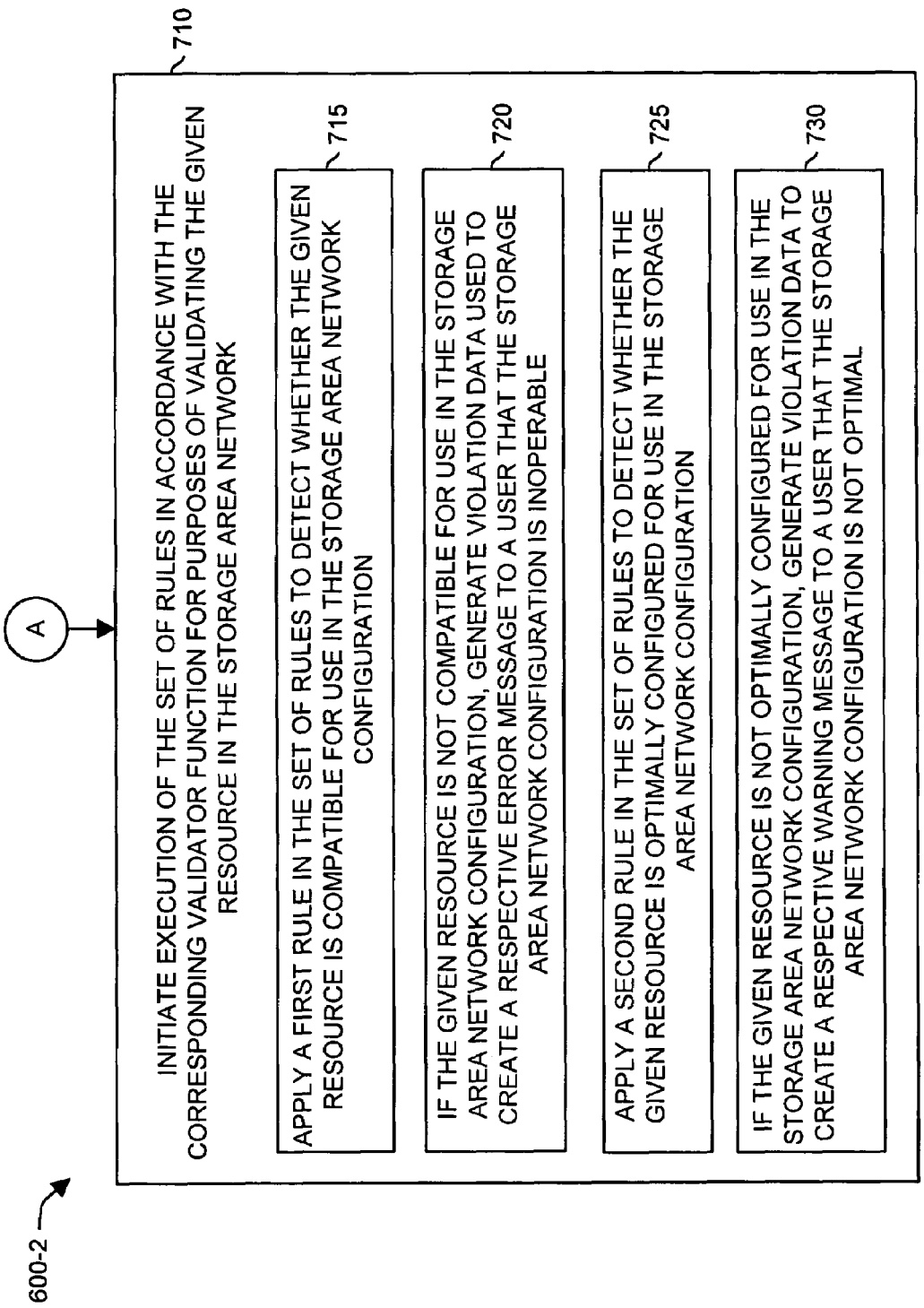

FIGS. 6 and 7 combine to form a flowchart 600 (e.g., flowchart 600-1 and flowchart 600-2) illustrating processing steps associated with rule engine process 145 according to an embodiment herein. Note that techniques discussed in flowchart 600 overlap with the techniques discussed above in the previous figures.

In step 610, the rule engine 145 maintains multiple validator functions 128, each of the validator functions 128 specifies a respective set of rules to apply to a corresponding type of storage area network resource.

In step 615, the rule engine 145 receives configuration information 194 identifying or representing a storage area network configuration.

In step 620, the rule engine 145 processes the configuration information 194 to identify a presence of a given resource (e.g., resource under test) in the storage area network configuration.

In step 625, the rule engine 145 identifies a resource type and/or attribute information associated with the given resource of multiple resources in the storage area network configuration.

In step 630, the rule engine 145 utilizes the resource type and/or attribute information associated with the given resource to identify a corresponding validator function specifying a set of rules to apply to the identified resource type.

In step 710 of flowchart 600-2 in FIG. 7, the rule engine 145 initiates execution of the set of rules in accordance with the corresponding selected validator function for purposes of validating the given resource (and/or related resources) in the storage area network.

In sub-step 715 associated with step 710, the rule engine 145 applies a first rule in the set of rules to detect whether the given resource is compatible for use in the storage area network configuration.

In sub-step 720 associated with step 710, if the given resource is not compatible for use in the storage area network configuration, the rule engine 145 generates violation data used to create a respective error message to a user that the storage area network configuration includes incompatible resources and is thus inoperable.

In sub-step 725 associated with step 710, the rule engine 145 applies a second rule in the set of rules to detect whether the given resource is optimally configured for use in the storage area network configuration.

In sub-step 730 associated with step 710, if the given resource is not optimally configured for use in the storage area network configuration, the rule engine 145 generates violation data. The violation data can be used to create a respective warning message to a user 108 that the storage area network configuration is sub-optimal.

As discussed above, the rule engine 145 can repeat the above steps (such as steps 620 to 730) for each of multiple resources specified in configuration information 194.

Figure 8:
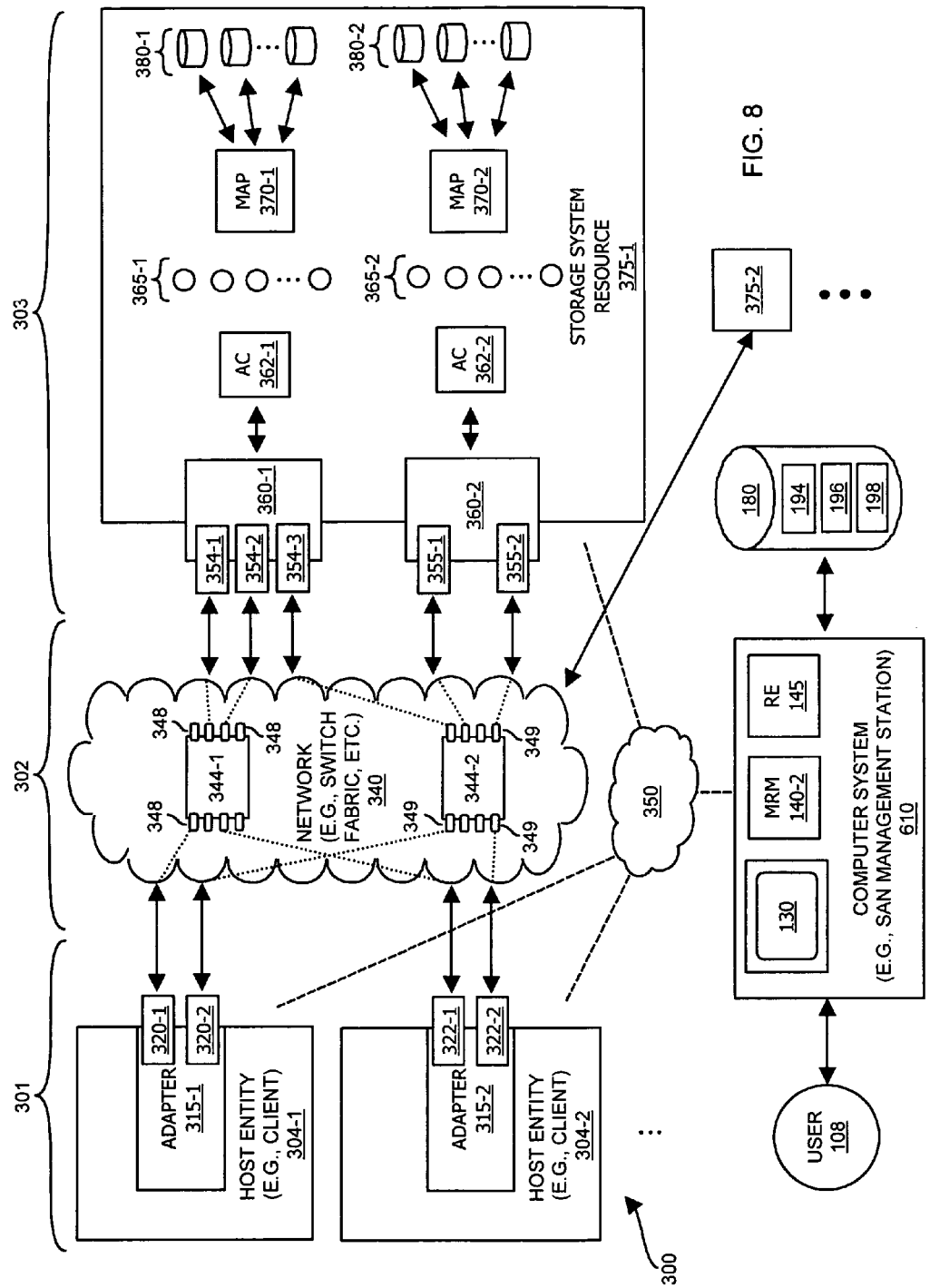
FIG. 8 is a block diagram illustrating resources in a storage area network environment represented by managed objects according to an embodiment herein.

FIG. 8 is a block diagram more particularly illustrating an example of connectivity associated with different types of resources (e.g., host resources 301, switch resources 302, and storage resources 303) in a storage area network environment 300. As previously discussed, the different types of resources in a system such as storage area network environment 300 can be represented by managed objects and/or corresponding relationship information stored in repository 180 as SAN configuration information 194.

As previously discussed for FIG. 1, rule engine 145 can apply rule logic 118 to produce message data 150. Message rendering module 140-2 can detect a display context associated with matter on display screen 130 and conditionally create and display pertinent rule violation messages for viewing on display screen 130 for user 108. The message rendering module 140-2 populates the messages depending on message data 150 generated by rule engine 145.

Now referring more particularly to individual resource as shown in FIG. 8, storage area network environment 300 includes host entity 304-1 (e.g., a server), host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 610, and repository 180. Network 340 includes switch device 344-1, switch device 344-2, and corresponding switch ports 348 and 349. Host entity 304-1 includes adapter 315-1. Adapter 315-1 (e.g., host bus adapter) has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 (e.g., a storage system) includes access controllers 362 to facilitate access to corresponding storage devices 365 (e.g., logical storage space or devices). Storage devices 365 are configured as logical portions of one or more physical storage devices 380 (e.g., arrays of one or more storage disks or portions thereof). Maps 370 provide a mapping of storage devices 365 (e.g., logical volumes) to corresponding physical storage devices 380 (e.g., storage disks).

As previously discussed, one purpose of rule engine 145 is to validate a configuration associated with a system such as storage area network environment 300. The message rendering module initiates display of violations, warnings, and/or informational messages for viewing on display screen 130 by user 108. Each host entity 304 may be limited to accessing certain storage devices 365 in storage system resource 375-1 based at least in part on configuration settings of switch devices 344 of network 340.

In further embodiments, computer system 610 enables a storage area network administrator to communicate over network 350 and/or network 340 and remotely modify a configuration of the storage area network 300. For example, in one embodiment, a storage area network administrator (e.g., a user 108) at a respective management station such as computer system 610 can modify the configuration of storage area network 300 via respective software commands in response to error, warning information generated by rule engine 145. In addition to being able to remotely modify the configuration of storage area network 300 via input to computer system 610, note also that a network administrator can physically change storage area network resources by replacement of one storage area network resource with another.

As discussed above, techniques herein are well suited for use in applications such as application of rules associated with a respective storage area network environment. However, it should be noted that configurations herein are not limited to such use and thus configurations herein and deviations thereof are well suited for use in other environments that generate messages as well.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:

1. A method comprising:
    identifying a resource type associated with a given resource of multiple resources in a respective storage area network configuration;
    utilizing the resource type associated with the given resource to identify a corresponding validator function specifying a set of rules to apply to the identified resource type; and
    initiating execution of the set of rules in accordance with the corresponding validator function for purposes of validating the given resource in the respective storage area network configuration.

2. A method as in claim 1, wherein initiating execution of the set of rules in accordance with the corresponding validator function includes executing at least a portion of the set of rules in a predetermined order according to an ordering specified by the validator function.

3. A method as in claim 1 further comprising:
    identifying that the corresponding validator function indicates that at least two rules in the set of rules can be executed in any order with respect to each other without regard to any particular order.

4. A method as in claim 1 further comprising:
    identifying that the corresponding validator function indicates that at least two rules in the set of rules must be executed in sequential order with respect to each other.

5. A method as in claim 1 further comprising:
    identifying that the corresponding validator function indicates that a first group of at least two rules in the set of rules can be executed in any order with respect to each other; and
    identifying that the corresponding validator function indicates that a second group of at least two rules in the set of rules must be executed in sequential order with respect to each other.

6. A method as in claim 1 further comprising:
    prior to identifying the resource type associated with the given resource:
        receiving configuration information identifying the respective storage area network configuration; and
        processing the configuration information to identify a presence of the given resource in the storage area network configuration.

7. A method as in claim 1, wherein initiating execution of the set of rules includes:
    for a first rule in the set of rules, forwarding an object associated with the given resource to corresponding rule logic associated with the first rule for purposes of executing the first rule; and
    wherein executing the first rule includes:
    identifying a set of information, other than information stored in the object, required to carry out execution of the first rule; and
    accessing the set of information from at least one repository to carry out execution of the first rule, the set of information including at least one of:
        i) product information associated with the given resource,
        ii) compatibility information indicating whether the given resource is compatible with other resources in the storage area network configuration, and
        iii) configuration information associated with resources in the storage area network other than the given resource.

8. A method as in claim 1, wherein validating the given resource in the storage area network includes:
    applying a first rule in the set of rules to detect whether the given resource is compatible for use in the storage area network configuration; and
    applying a second rule in the set of rules to detect whether the given resource is optimally configured for use in the storage area network configuration.

9. A method as in claim 8 further comprising:
    if the given resource is not compatible for use in the storage area network configuration, generating violation data used to create a respective error message to a user that the storage area network configuration is inoperable; and
    if the given resource is not optimally configured for use in the storage area network configuration, generating violation data to create a respective warning message to a user that the storage area network configuration is not optimal.

10. A method as in claim 1, wherein initiating execution of the set of rules in accordance with the corresponding validator function includes:
    utilizing the validator function for purposes of identifying at least two rules in the set of rules that operate on a same set of configuration data associated with the storage area network configuration, the validator function providing an indication that each of the at least two rules can be applied to the same set of configuration data in any order.

11. A method as in claim 1 further comprising:
    maintaining multiple validator functions, each of which specifies a respective set of rules to apply to a corresponding type of storage area network resource in the storage area network configuration, a first validator function of the multiple validator functions being nested within a second validator function of the multiple validator functions to specify a combined grouping of a first set of rules associated with the first validator function and a second set of rules associated with the second validator function to apply to a specified type of resource in the storage area network configuration.

12. A method as in claim 1, wherein initiating execution of the set of rules in accordance with the corresponding validator function includes:
    selectively applying each rule in the set of rules to the given resource depending on whether a respective rule includes an associated type identifier indicating that the respective rule applies to a type associated with the given resource; a
    producing output data indicating whether the given resource is compatible for use in the respective storage area network configuration.

13. A method as in claim 12, wherein selectively applying each rule includes:
    for each rule in the set of rules specified by the corresponding validator function:
        detecting whether a respective rule has an associated type identifier indicating to apply the respective rule to a type as specified by the given resource; and
        if so, executing the respective rule to validate the given resource with respect to the respective rule; and
        if not, disregarding execution of the respective rule to validate the given resource with respect to the respective rule.

14. A method as in claim 1, wherein validating the given resource includes:
    verifying that the given resource is compatible for use in the storage area network environment along with other resources associated with the respective storage area network configuration; and producing output data indicating whether the given resource is compatible for use in the respective storage area network configuration.

15. A computer program product including a tangible computer-readable medium having instructions stored thereon for processing data information, such that the instructions, when carried out by a processing device, enable the processing device to perform the steps of:
- identifying a resource type associated with a given resource of multiple resources in a respective storage area network configuration;
- utilizing the resource type associated with the given resource to identify a corresponding validator function specifying a set of rules to apply to the identified resource type; and
- initiating execution of the set of rules in accordance with the corresponding validator function for purposes of validating the given resource in the respective storage area network configuration.

16. A computer program product as in claim 15 having instructions that further support steps of:
- identifying that the corresponding validator function indicates that a first group of at least two rules in the set of rules can be executed in any order with respect to each other; and
- identifying that the corresponding validator function indicates that a second group of at least two rules in the set of rules must be executed in sequential order with respect to each other.

17. A computer program product as in claim 15, wherein initiating execution of the set of rules in accordance with the corresponding validator function includes:
- for each rule in the set of rules specified by the corresponding validator function:
  - detecting whether a respective rule has an associated type identifier indicating to apply the respective rule to a type as specified by the given resource; and
  - if so, executing the respective rule to validate the given resource with respect to the respective rule; and
  - if not, disregarding execution of the respective rule to validate the given resource with respect to the respective rule.

18. A computer system comprising:
- a processor;
- a memory unit that stores instructions associated with an application executed by the processor; and
- an interconnect coupling the processor and the memory unit, enabling the computer system to execute the application and perform operations of:
  - identifying a resource type associated with a given resource of multiple resources in a respective storage area network configuration;
  - utilizing the resource type associated with the given resource to identify a corresponding validator function specifying a set of rules to apply to the identified resource type; and
  - initiating execution of the set of rules in accordance with the corresponding validator function for purposes of validating the given resource in the respective storage area network configuration.

19. A method as in claim 1, wherein the corresponding validator function is a first validator function, the method further comprising:
- maintaining multiple validator functions including the first validator function and a second validator function, the first validator function specifying a first set of rules to test compatibility of a first type of storage area network resource in the storage area network configuration, the second validator function specifying a second set of rules to test compatibility of a second type of storage area network resource in the storage area network configuration;
- maintaining the second validator function to include a reference to the first validator function as well as references to each rule in the second set of rules;
- applying the first set of rules and second set of rules to test compatibility of the given resource based on application of the second validator function to the given resource; and
- producing output data indicating whether the given resource is compatible for use in the respective storage area network configuration based at least in part on application of the first set of rules and the second set of rules.

20. A method as in claim 1, wherein initiating execution of the set of rules in accordance with the corresponding validator function includes:
- accessing filter information associated with a particular rule specified by the corresponding validator function, the filter information indicating whether the particular rule is used for testing the resource type associated with the given resource; and
- producing output data indicating whether the given resource is compatible for use in the respective storage area network configuration based at least in part on application of the particular rule to the given resource.

* * * * *